(12) United States Patent
Liang (10) Patent No.: US 7,707,431 B2
(45) Date of Patent: Apr. 27, 2010

(54) DEVICE OF APPLYING PROTECTION BIT CODES TO ENCRYPT A PROGRAM FOR PROTECTION

(75) Inventor: Bor-Sung Liang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1007 days.

(21) Appl. No.: 10/923,742

(22) Filed: Aug. 24, 2004

(65) Prior Publication Data

US 2005/0050341 A1    Mar. 3, 2005

(30) Foreign Application Priority Data

Aug. 28, 2003    (TW) .............................. 92123814 A (51) Int. Cl.
*G06F 11/30*    (2006.01)
(52) U.S. Cl. .............................. 713/190; 726/4; 380/28
(58) Field of Classification Search .................. 713/190; 726/4; 380/28
See application file for complete search history.

(56) References Cited

U.S. PATENT DOCUMENTS

| | | | | |
|---|---|---|---|---|
| 6,272,257 B1* | 8/2001 | Prokop | ........................ | 382/246 |
| 6,374,386 B1* | 4/2002 | Kim et al. | .................... | 714/786 |
| 6,487,693 B1* | 11/2002 | Kim et al. | .................... | 714/786 |
| 6,504,493 B1* | 1/2003 | Burd | ............................ | 341/50 |
| 6,999,407 B2* | 2/2006 | Moon | ......................... | 370/215 |
| 7,093,181 B2* | 8/2006 | Kim et al. | .................... | 714/758 |
| 2003/0048900 A1* | 3/2003 | Kim et al. | ................... | 380/229 |

\* cited by examiner

*Primary Examiner*—Kambiz Zand
*Assistant Examiner*—Amare Tabor
(74) *Attorney, Agent, or Firm*—Bacon & Thomas, PLLC (57) ABSTRACT

A device of applying protection bit codes to encrypt a program for protection is disclosed. The program has a plurality of instructions P (positive integer). The device includes a protection-bit-code generator, a first protection-bit-code location generator and a protection-bit-code insertion unit. The protection-bit-code generator generates a plurality of protection bit codes in accordance with the plurality of instructions of the program, wherein each instruction has a plurality of bits I (positive integer). The first protection-bit-code location generator generates a plurality of insertion positions N (positive integer) for each protection bit code in accordance with processor status when executing the program. The protection-bit-code insertion unit inserts each protection bit code in a position between (N−1)th- and Nth-bit of a respective instruction of the program in accordance with the insertion position N generated by the first protection-bit-code location generator, thereby generating an encrypted program.

46 Claims, 6 Drawing Sheets

| Address | F3(x, a) | 31 | 24 23 | 16 15 | 8 7 | 0 |
|---------|----------|----|-------|-------|-----|---|
| 1F00 0000 | 3  |   |   |   | P |   |
| 1F00 0001 | 19 |   | P |   |   |   |
| 1F00 0010 | 11 |   |   | P |   |   |
| 1F00 0011 | 27 | P |   |   |   |   |
| 1F00 0100 | 7  |   |   |   | P |   |
| 1F00 0101 | 23 |   | P |   |   |   |
| 1F00 0110 | 15 |   |   | P |   |   |
| 1F00 0111 | 31 | P |   |   |   |   |

DEVICE OF APPLYING PROTECTION BIT CODES TO ENCRYPT A PROGRAM FOR PROTECTION

BACKGROUND OF THE INVENTION

1. Field of the Invention

The present invention relates to the technical field of data protection for a processor and, more particularly, to a device of applying protection bit codes to encrypt a program for protection.

2. Description of Related Art

Due to the importance of intellectual properties, manufactories typically encrypt their intellectual property (IP) related programs off-line for protection and store the programs encrypted in a non-volatile memory or storage medium, such that an unauthorized person cannot restore the data even if he/she obtains the memory or storage medium with the programs encrypted, thereby achieving protection purpose.

U.S. Pat. No. 6,408,073 granted to Hsu, et al. for an "Scramble circuit to protect data in a read only memory" discloses a scramble circuit for protecting data stored in a read only memory (ROM) by applying both a pseudo-random generator and an initial value seed1/seed2 to code ROM data and thus generates encoded data. However, since the scrambling technology uses random numbers as parameters, such a data protection method requires a synchronous random generator for decoding. It also needs many patterns of random numbers to effectively prevent an unauthorized person from retrieving the programs encrypted, which means that a pseudo random generator for encoding and decoding needs highly complicated circuitry. Thus, the cost increases much. On the contrary a simpler pseudo random generator for encoding and decoding can be used to save the cost. In this way, programs encrypted can be retrieved by an unauthorized person easily.

Therefore, it is desirable to provide an improved device and method to mitigate and/or obviate the aforementioned problems.

SUMMARY OF THE INVENTION

The object of the present invention is to provide a device of applying protection bit codes to encrypt a program for protection, thereby avoiding complicated pseudo random generator in the prior art and thus saving cost. Also, encrypting time is reduced due to very simple protection-bit-code generation/removal devices, thereby increasing entire performance.

In accordance with the first aspect of the present invention, there is provided a device of applying protection bit codes to encrypt a program for protection. The program has a plurality of instructions. The device includes a protection-bit-code generator, a protection-bit-code location generator and a protection-bit-code insertion unit. The protection-bit-code generator generates a plurality of protection bit codes in accordance with the plurality of instructions of the program, wherein each instruction has a plurality of bits I (positive integer). The protection-bit-code location generator generates an insertion position N (positive integer) for each protection bit code in accordance with processor status when executing the program. The protection-bit-code insertion unit inserts each protection bit code in a position between (N−1)th- and Nth-bit of a respective instruction of the program in accordance with each insertion position N generated by the protection-bit-code location generator, thereby generating an encrypted program.

In accordance with the second aspect of the present invention, there is provided a device of decrypting an encrypted program. The encrypted program has a plurality of instructions and is produced by inserting protection bit codes in a source program for encryption. The device of decrypting an encrypted program includes a protection-bit-code location generator and a protection-bit-code removal unit. The protection-bit-code location generator generates an insertion position N for each protection bit code in accordance with processor status when executing the encrypted program. The protection-bit-code removal unit inputs the encrypted program and removes Nth bit of a respective instruction of the encrypted program input in accordance with each insertion position N generated by the protection-bit-code location generator.

In accordance with the third aspect of the present invention, there is provided a device of decrypting an encrypted program. The encrypted program has a plurality of instructions and is produced by inserting two sets of protection bit codes in a source program for encryption, wherein one word can contain two encrypted instructions. The device of decrypting an encrypted program includes a first protection-bit-code location generator, a second protection-bit-code location generator, a first protection-bit-code removal unit and a second protection-bit-code removal unit. The first protection-bit-code location generator generates a first insertion position N1 (positive integer) for each protection bit code in accordance with processor status when executing the encrypted program. The second protection-bit-code location generator generates a second insertion position N2 (positive integer) for each protection bit code in accordance with processor status when executing the encrypted program. The first protection-bit-code removal unit inputs a low half word of the encrypted program and removes (N1)th bit from 0th-(K−1)th bits of the instructions of the encrypted program input in accordance with each first insertion position N1 generated by the first protection-bit-code location generator. The second protection-bit-code removal unit inputs a high half word of the encrypted program and removes (N2)th bit from Kth-(2K−1)th bits of the instructions of the encrypted program input in accordance with each second insertion position N2 generated by the second protection-bit-code location generator.

In accordance with the fourth aspect of the present invention, there is provided a method of applying protection bit codes to encrypt a program for protection, the program having a plurality of instructions, each instruction having I (positive integer) bits. The method comprises: (A) a protection-bit-code generating step, which generates a corresponding plurality of protection bit codes in accordance with the instructions of the program, wherein each protection bit code has P (positive integer) bits; (B) a first protection-bit-code location generating step, which generates an insertion position N (positive integer) for each protection bit code in accordance with processor status when executing the program; and (C) a protection-bit-code inserting step, which generates an encrypted program by inserting each protection bit code in a position between (N−1)th and Nth of a respective instruction of the program in accordance with each insertion position N generated in the first protection-bit-code location generating step.

In accordance with the fifth aspect of the present invention, there is provided a method of decrypting an encrypted program produced by inserting protection bit codes in a source program for encryption and having a plurality of instructions. The method comprises: (A) a protection-bit-code location generating step, which generates insertion positions respectively for the protection bit codes in accordance with processor status when executing the encrypted program; and (B) a protection-bit-code removing step, which inputs the encrypted program in order to remove Nth bit of a respective instruction of the encrypted program in accordance with each insertion position N (positive integer) generated in the protection-bit-code location generating step.

In accordance with the sixth aspect of the present invention, there is provided a method of decrypting an encrypted program produced by inserting two sets of protection bit codes in a source program for encryption and having a plurality of instructions, wherein one word contains two instructions. The method comprises: (A) a first protection-bit-code location generating step, which generates first insertion positions for the protection bit codes in accordance with processor status when executing the encrypted program; (B) a second protection-bit-code location generating step, which generates second insertion positions for the protection bit codes in accordance with processor status when executing the encrypted program; (C) a first protection-bit-code removing step, which inputs a low half word of the encrypted program and removes (N1)th bit from 0th-(K−1)th bits of a respective instruction of the encrypted program input in accordance with each first insertion position N1 (positive integer) generated in the first protection-bit-code location generating step; and (D) a second protection-bit-code removing step, which inputs a high half word of the encrypted program and removes (N2)th bit from Kth-(2K−1)th bits of a respective instruction of the encrypted program input in accordance with each second insertion position N2 (positive integer) generated in the second protection-bit-code location generating step.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
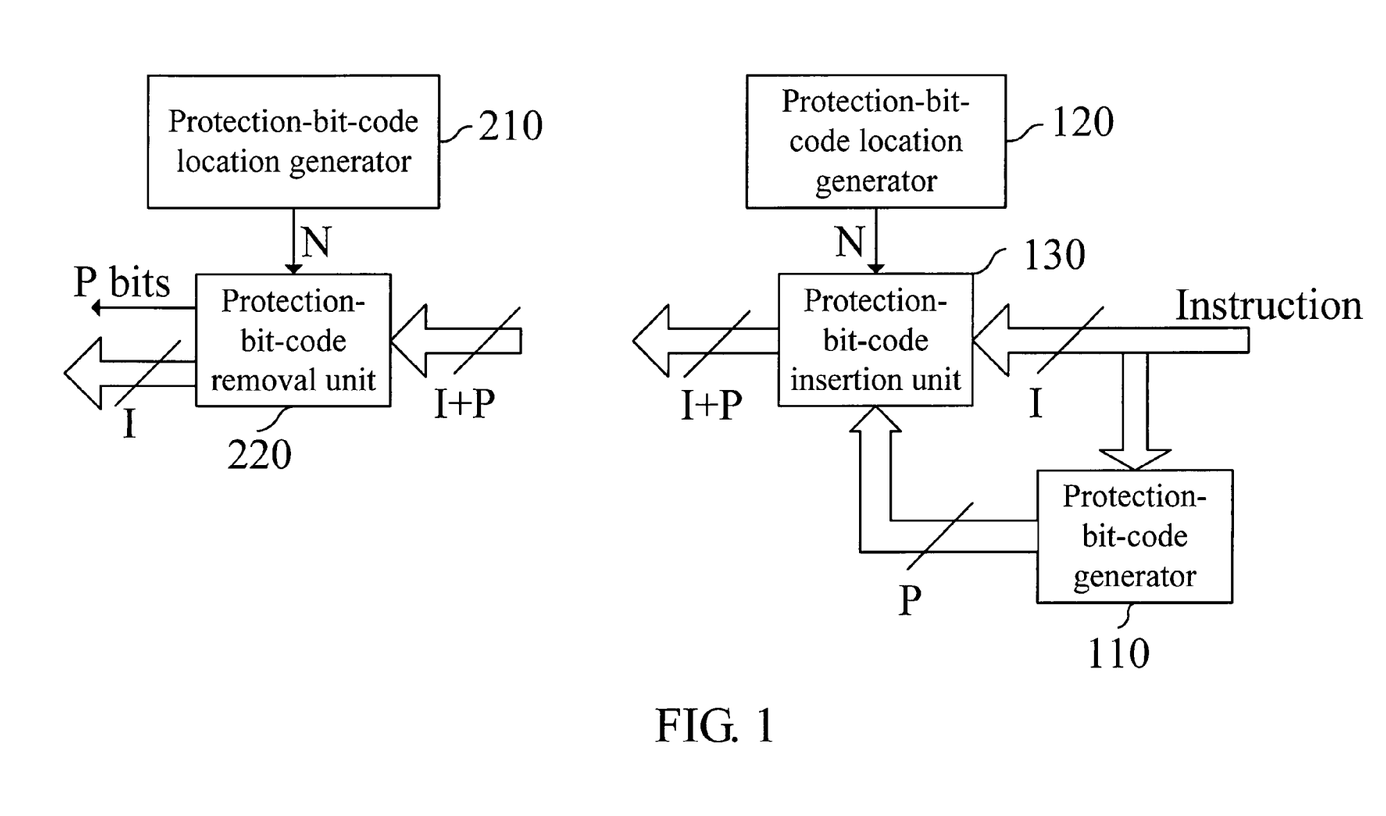
FIG. 1 is a block diagram of a device of applying protection bit codes to encrypt a program for protection in accordance with the invention.

FIG. 1 is a block diagram of a device of applying protection bit codes to encrypt a program for protection in accordance with the invention. In FIG. 1, the device includes a protection-bit-code generator 110, a protection-bit-code location generator 120, a protection-bit-code insertion unit 130, a protection-bit-code location generator 210 and a protection-bit-code removal unit 220. A program to be encrypted has a plurality of instructions, each having I (positive integer) bits while each protection bit code has P (positive integer) bits. In this embodiment, it is preferred to have I=31 and P=1 (I+P=32), or I=32 and P=1.

As shown in FIG. 1, the protection-bit-code generator 110 generates a respective protection bit code in accordance with each instruction of the program. The protection bit code can be parity bit, error correction code (ECC) or indication bits of a processor mode at instruction execution.

The protection-bit-code location generator 120 generates an insertion position N (positive integer) for each protection bit code in accordance with processor status when executing the program. The protection-bit-code insertion unit 130 inserts each protection bit code in a position between (N−1)th- and Nth-bit of a respective instruction of the program in accordance with each insertion position N generated by the protection-bit-code location generator 120, thereby generating an encrypted program.

The protection-bit-code location generator 210 generates an insertion position N for each protection bit code in accordance with processor status when executing the encrypted program. The protection-bit-code removal unit 220 inputs an encrypted program. The encrypted program is produced by inserting protection bit codes in a source program for encryption and removes protection bit code of each instruction of the encrypted program in accordance with each insertion position N generated by the protection-bit-code location generator 210.

Figure 2:
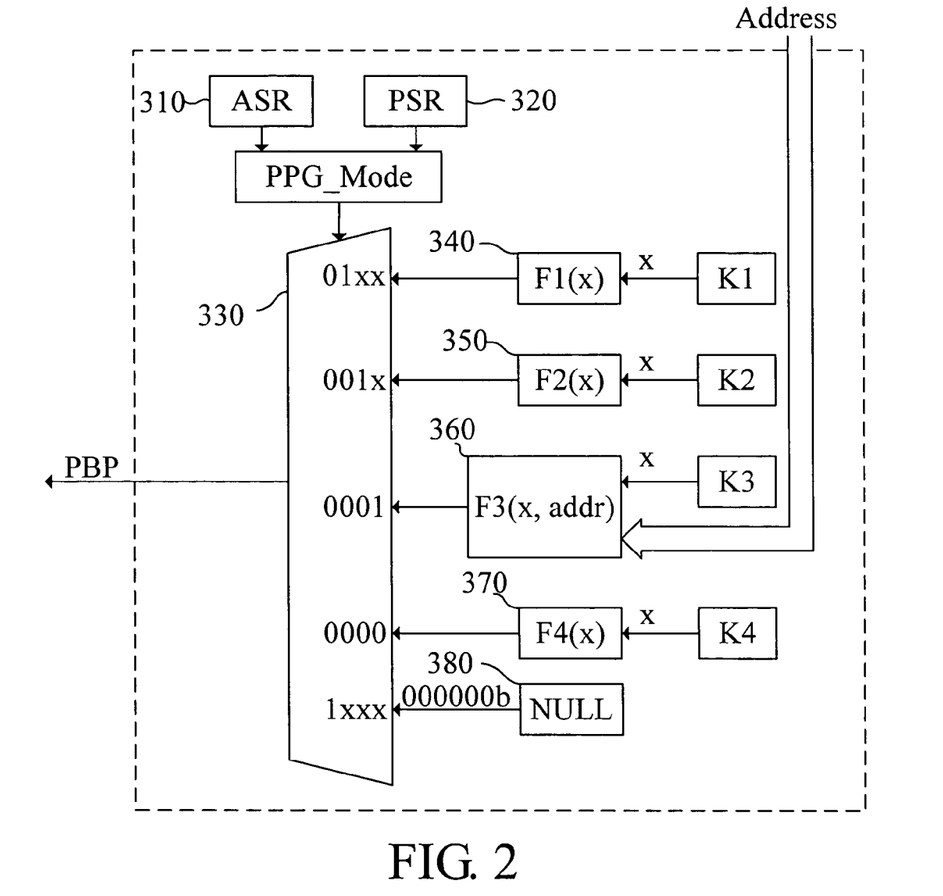
FIG. 2 is a circuit of a protection-bit-code location generator in accordance with the invention.

The protection-bit-code location generator 120 and the protection-bit-code location generator 210 generate inserting positions in accordance with processor status when executing the program. FIG. 2 is a circuit of the protection-bit-code location generator 210 and protection-bit-code location generator 120 in accordance with the invention. In FIG. 2, each of the protection-bit-code location generator 120 and the protection-bit-code location generator 210 includes an access status register (ASR) 310, a program status register (PSR) 320, a multiplexer 330 and multiple insertion position generators 340-380.

The ASR 310 contains one bit with a value of $1_b$ to indicate that the processor is to access data block or a value of $0_b$ to indicate that the processor is to access program block. The PSR 320 contains 3 bits with a value of $1xx_b$ to indicate that the processor enters a status of executing BIOS program after reset, a value of $01x_b$ to indicate that the processor is at a status of OS kernel, a value of $001_b$ to indicate that the processor is at a status of special authentication program, or a value of $000_b$ to indicate that the processor is at a status of normal user program.

PPG_Mode signal in FIG. 2 is used to select an output signal PBP (P bit position) of the multiplexer 330 from its input signals. The PPG_Mode signal is composed of the outputs of the ASR 310 and the PSR 320 to form a relation of PPG_Mode={ASR, PSR[2:0]}. When the process accesses data block, the ASR 310 has a value of $1_b$, PPG_Mode signal is equal to $1xxx_b$ (PPG_Mode=$1xxx_b$), and thus the multiplexer 330 selects an output of the insertion position generator 380 as the output signal PBP. After the processor is reset, it enters the status of executing BIOS program, the ASR 310 has a value of $0_b$, the PSR 320 has a value of $1xx_b$, and thus the multiplexer 330 selects an output of the insertion position generator 340 as the output signal PBP.

The multiple insertion position generators 340-380 generate insertion positions in accordance with their predetermined functions. The insertion position generator 380 can be a null function that represents no insertion position and has an output signal of $000000_b$. The insertion position generator 340 generates insertion position by performing modulus operation with a given value x, i.e., $F1(x)=(x \bmod 32)$. The insertion position generator 350 subtracts a second given value after modulus operation from a first given value, i.e., $F2(x)=31-(x \bmod 32)$.

The insertion position generator 360 generates insertion position by doing firstly a union of a partial address value of the processor and a first given value, and then a modulus operation, i.e., $F3(x, a)=[(x+\{a[0], a[1], a[2], a[3], a[4]\})$ mod 32]. The insertion position generator 370 generates insertion position by re-ordering a given value $x[4:0]$ bit position, i.e, $F4(x)=\{x[0], x[1], x[2], x[3], x[4]\}$. Alternatively, the insertion position generator 370 can generate insertion position by combining contents of the ASR 310 and the PSR 320 or further performing modulus operation on the combination.

The multiple insertion position generators 340-380 are provided respectively with K1, K2, K3 and K4 shown in FIG. 2 as a given value. The given values can be recorded in advance in a hardware circuitry or loaded in a register set by the system. As such, insertion positions for different protection bit codes are provided to different programs and different status of the processor.

Figure 3:
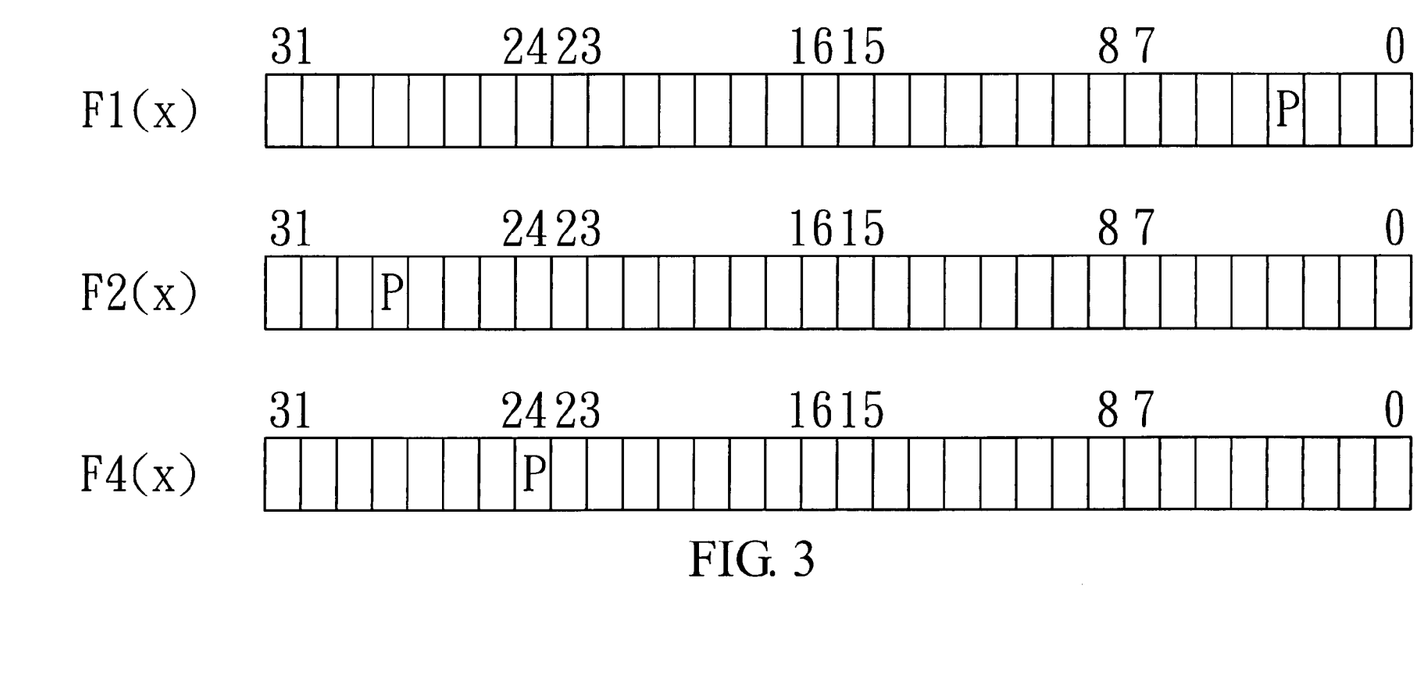
FIGS. 3 and 4 are schematic diagrams of insertion positions generated by a protection-bit-code location generator in accordance with the invention.

FIG. 3 shows different insertion positions for protection bit codes generated by the multiple insertion position generators 340, 350 and 380 as K1, K2, K3, and K4 are equal to 3 respectively. As shown in FIG. 3, $F1(x)=(x \bmod 32)=3$ represents that, when a processor enters the status of executing BIOS program after reset, the insertion position for protection bit code is at bit 3. $F2(x)=[31-(x \bmod 32)]=28$ represents that, when the processor is at a status of OS Kernel, the insertion position for protection bit code is at bit 28. $F4(x)=\{x[0], x[1], x[2], x[3], x[4]\}=\{11000b\}=24$ represents that, when the processor is at a status of normal user program, the insertion position for protection bit code is at bit 24.

Figure 4:
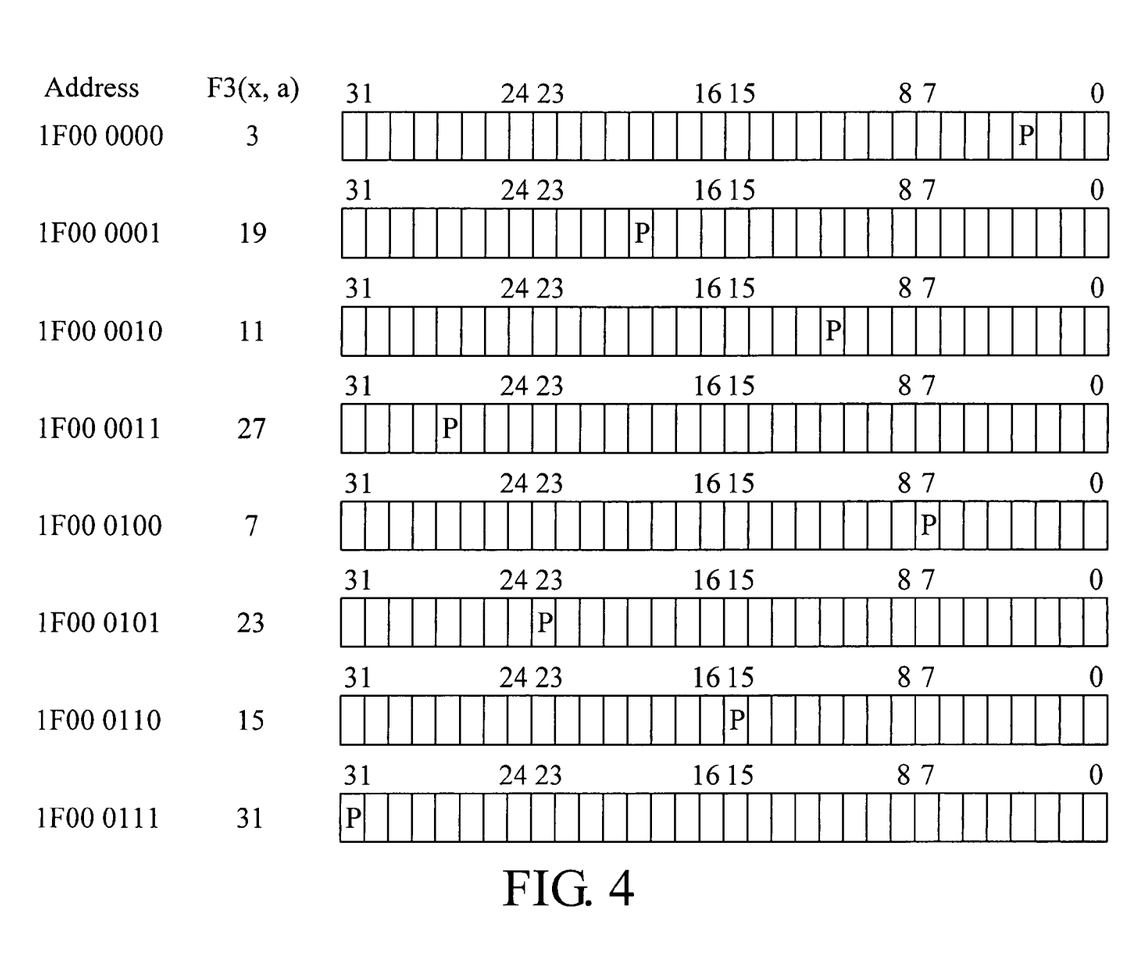

FIG. 4 shows different insertion positions for protection bit codes generated by the multiple insertion position generator when K3=3. $F3(x, a)=(x+\{a[0], a[1], a[2], a[3], a[4]\})$ mod $32=(3+\{a[0], a[1], a[2], a[3], a[4]\})$ mod 32 represents that, when the processor is at an authentication program, the insertion position for protection bit code presents a change as shown in FIG. 4, such that the authentication program is hard to be maliciously analyzed and copied.

The output signal PBP of the multiplexer 330 consists of 6 bits, where Boolean value of PBP[5] indicates whether to have insertion position for protection bit code in PBP[4:0] or not. There is no insertion position for protection bit code exists when PBP[5:0]=0xxxxx$_b$. There is an insertion position for protection bit code exists in PBP[4:0] at a position of 00101b (bit 5) when PBP[5:0]=100101$_b$. Since the insertion position generators 340-370 generate insertion positions for protection bit codes, their output signals combine to a high potential to thus generate the output signal PBP[5:0] of the multiplexer 330. The high potential forms PBP[5] (i.e., PBP[5]=1) to represent showing insertion position for protection bit code in PBP[4:0]. The insertion position generator 380 is a null means representative of no insertion position and thus its output signal is 000000$_b$ representing no insertion position showing in PBP[4:0].

Figure 5:
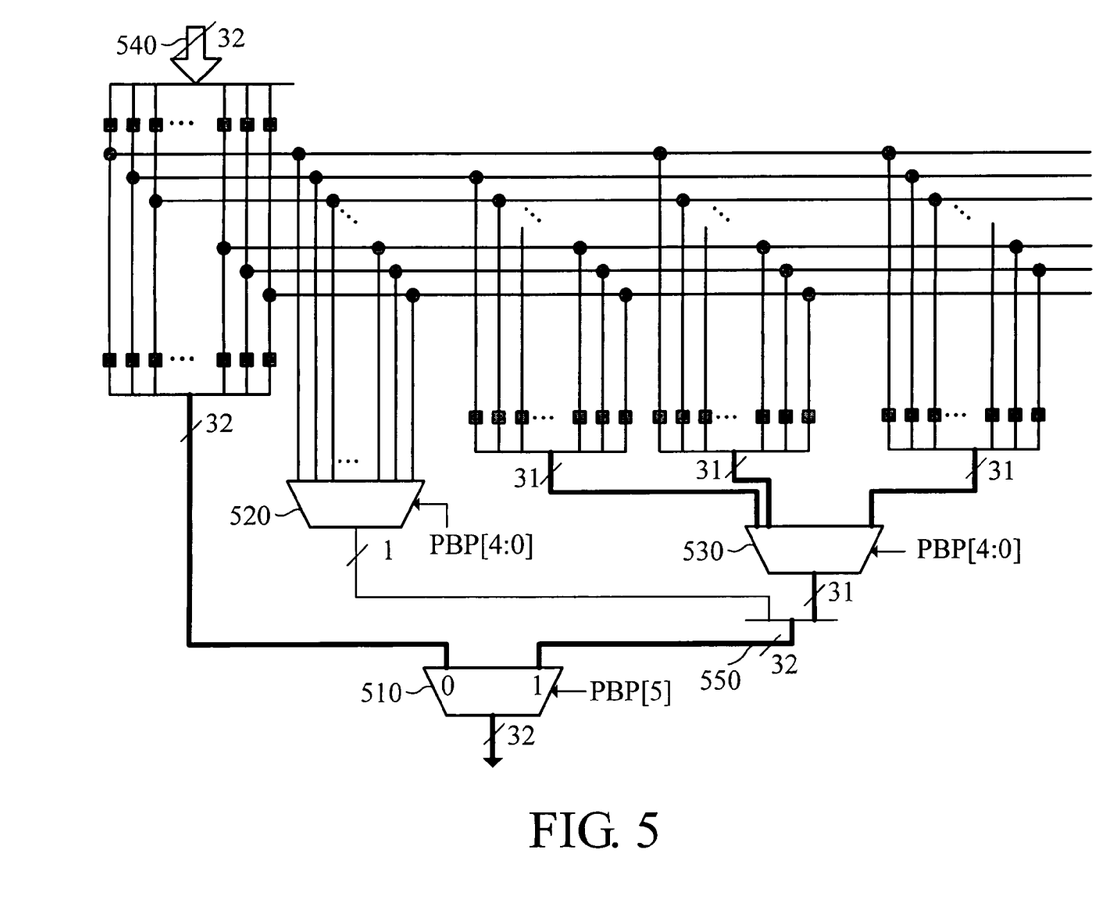
FIG. 5 is a circuit of a protection-bit-code removal unit in accordance with the invention.

FIG. 5 is a circuit of the protection-bit-code removal unit 220, essentially including multiplexers 510, 520 and 530. As shown in FIG. 5, an input terminal 540 inputs a 32-bit encrypted program formed by inserting protection bit codes in a source program for encryption. The protection bit codes in the instructions of the encrypted program are removed in accordance with insert positions PBP[4:0] generated by the protection-bit-code location generator 210. Since no insertion position for protection bit code is shown in PBP[4:0] when PBP[5:0]=0, the multiplexer 510 directly outputs the output terminal 540. Since insertion position for protection bit code is shown in PBP[4:0] when PBP [5:0]=1, the multiplexer 520 outputs respective protection bit code in accordance with the PBP[4:0] signal and also the multiplexer 530 outputs an instruction without the protection bit code in accordance with the PBP[4:0] signal. Next, the protection bit code and the instruction without the protection bit code form a 32-bit word to the multiplexer 510 for output when PBP[5]=1.

In this embodiment, the protection bit code generator 110, the protection-bit-code location generator 120 and the protection-bit-code insertion unit 130 can be realized by a hardware or processed off-line by a software, thereby generating an encrypted program. The protection-bit-code removal unit 220 and the protection-bit-code location generator 210 can incorporate with a processor core. The protection-bit-code removal unit 220 inputs the encrypted program and decrypts it by removing the protection bit codes from the instructions of the encrypted program in accordance with insertion positions N generated by the protection-bit-code location generator 210, thus the processor core can properly execute the decrypted program. The encrypted program cannot be maliciously analyzed and copied easily by others, thereby achieving program protection.

Figure 6:
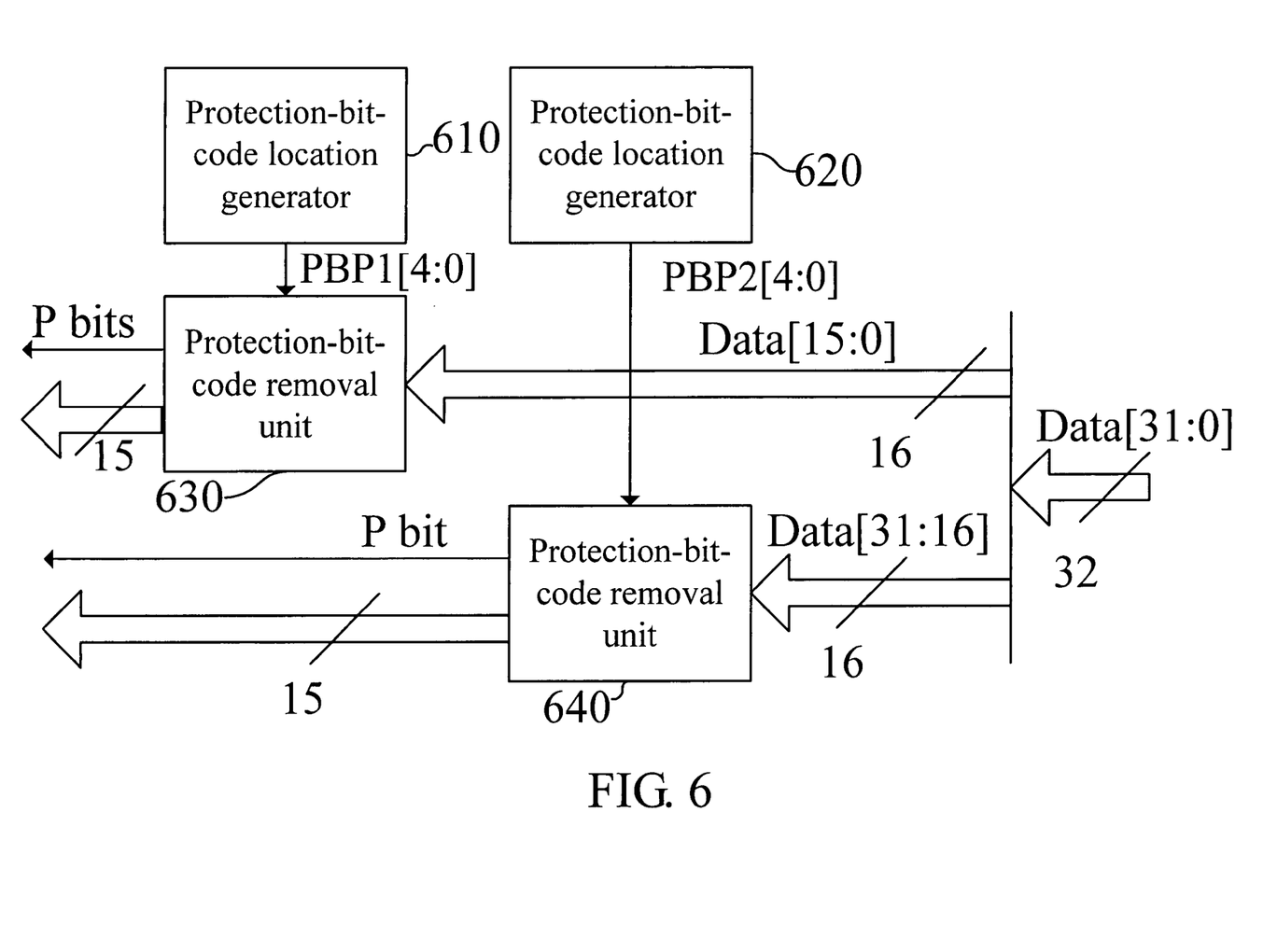
FIG. 6 is a block diagram of another embodiment of a device of applying protection bit codes to encrypt a program for protection in accordance with the invention.

FIG. 6 is another embodiment of the invention. In FIG. 6, a device of decrypting an encrypted program is shown. The encrypted program is generated by inserting two sets of protection bit codes in a source program that has a plurality of instructions. In addition, one word can have two encrypted instructions that have 16 bits each. The device includes a protection-bit-code location generator 610, a protection-bit-code location generator 620, a protection-bit-code removal unit 630 and a protection-bit-code removal unit 640.

The protection-bit-code location generator 610 and the protection-bit-code location generator 620 generate insertion position PBP1[4:0] and insertion position PBP[4:0] respectively for each protection bit code in accordance with processor status at the program execution.

The protection-bit-code removal unit 630 inputs low half word of the encrypted program and removes respective (PBP1[4:0])th bit of 0th-15th bits of a respective instruction of the encrypted program in accordance with each third insertion position PBP1[4:0] generated by the protection-bit-code location generator 610. The protection-bit-code removal unit 640 inputs high half word of the encrypted program and removes PBP2[4:0]th bit of 16th-31st bits of a respective instruction of the program in accordance with each fourth insertion position PBP2[4:0] generated by the protection-bit-code location generator 620.

In view of foregoing, it is known that the invention can protect program by applying very simple hardware to encrypt/decrypt the program, without using complicated pseudo random generator to thus save cost. In addition, it spends less time for encryption/decryption and thus has better performance than the prior art.

Although the present invention has been explained in relation to its preferred embodiment, it is to be understood that many other possible modifications and variations can be made without departing from the spirit and scope of the invention as hereinafter claimed.

What is claimed is:

1. A device of applying protection bit codes to encrypt a program for protection, comprising:

a protection-bit-code generator, which generates a corresponding plurality of protection bit codes in accordance with a plurality of instructions of the program, wherein each instruction has P (positive integer) bits, and the protection bit codes are parity bits;

a first protection-bit-code location generator, which generates a respective insertion position N (positive integer)

for each protection bit code in accordance with processor status when executing the program;

a protection-bit-code insertion unit, which inserts each protection bit code in a position between (N−1)th- and Nth-bit of a respective instruction in accordance with each insertion position N generated by the first protection-bit-code location generator, thereby generating an encrypted instruction;

a second protection-bit-code location generator, which generates a respective insertion position N for each protection bit code in accordance with processor status when executing the program; and a protection-bit-code removal unit, which inputs the program and removes Nth bit of the respective instruction of the program in accordance with the insertion position N generated by the second protection-bit-code location generator;

wherein the first protection-bit-code location generator and the second protection-bit-code location generator generate their insertion positions in accordance with a processor status when executing the program, and each protection-bit-code location generator comprises:

an access status register (ASR), which indicates that the processor is accessing data or program block;

a program status register (PSR), which indicates current processor status;

a plurality of insertion position generators, which generate insertion positions in accordance with the predetermined functions; and a multiplexer, which has multiple input terminals respectively connected to output terminals of the insertion position generators in order to select one of the insertion positions generated by the insertion position generators through the input terminals for output.

2. The device as claimed in claim 1, wherein the insertion position generators are null devices respectively for representation of no insertion position.

3. The device as claimed in claim 1, wherein the insertion position generators generate the insertion positions respectively by applying a given value to a function operation.

4. The device as claimed in claim 1, wherein the insertion position generators generate the insertion positions respectively by subtracting a result of function operation of a second given value from a first given value.

5. The device as claimed in claim 1, wherein the insertion position generators generate the insertion positions respectively by applying a union of a first given value and a partial address value of the processor to a function operation.

6. The device as claimed in claim 1, wherein the insertion position generators generate the insertion positions respectively by combining contents of the ASR and the PSR.

7. The device as claimed in claim 1, wherein the insertion position generators generate the insertion positions respectively by firstly combining contents of the ASR and the PSR and then performing a function operation on the combined.

8. The device as claimed in claim 1, wherein the protection-bit-code removal unit further moves the Nth bit of the respective instruction of the program to the most significant bit (MSB) of the respective instruction in accordance with the insertion position N generated by the second protection-bit-code location generator.

9. The device as claimed in claim 1, wherein the protection-bit-code removal unit further moves the Nth bit of the respective instruction of the program to the least significant bit (LSB) of the respective instruction in accordance with the insertion position N generated by the second protection-bit-code location generator.

10. The device as claimed in claim 1, wherein the protection-bit-code removal unit further outputs the respective instruction of the program directly in accordance with the insertion position N generated by the second protection-bit-code location generator.

11. The device as claimed in claim 1, wherein I+P=32.

12. The device as claimed in claim 1, wherein I=32.

13. A device of decrypting an encrypted program produced by inserting protection bit codes in a source program for encryption and having a plurality of instructions, in which the protection bit codes are parity bits, the device comprising:

a protection-bit-code location generator, which generates insertion positions for the protection bit codes in accordance with a processor status when executing the encrypted program; and a protection-bit-code removal unit, which inputs the encrypted program and removes Nth bit of a respective instruction of the encrypted program input in accordance with insertion position N generated by the protection-bit-code location generator;

wherein the protection-bit-code location generator generates insertion positions in accordance with a processor status when executing the program, and the protection-bit-code location generator further comprises:

an access status register (ASR), which indicates that the processor is accessing data block or program block;

a program status register (PSR), which indicates current processor status;

a plurality of insertion position generators, which generate the insertion positions in accordance with predetermined functions; and a multiplexer, which has multiple input terminals connected to output terminals of the insertion position generators respectively, in order to select one of the insertion positions through the input terminals for output.

14. The device as claimed in claim 13, wherein the insertion position generators respectively are null devices respectively for representation of no insertion position.

15. The device as claimed in claim 13, wherein the insertion position generators generate the insertion positions respectively by applying a given value to a function operation.

16. The device as claimed in claim 13, wherein the insertion position generators generate the insertion positions respectively by subtracting a result of function operation of a second given value from a first given value.

17. The device as claimed in claim 13, wherein the insertion position generators generate the insertion positions respectively by applying a union of a first given value and a partial address value of the processor to a function operation.

18. The device as claimed in claim 13, wherein the insertion position generators generate the insertion positions respectively by combining contents of the ASR and the PSR.

19. The device as claimed in claim 13, wherein the insertion position generators generate the insertion positions respectively by firstly combining contents of the ASR and the PSR and then performing a function operation on the combined.

20. The device as claimed in claim 13, wherein I+P=32.

21. The device as claimed in claim 13, wherein I=32.

22. A device of decrypting an encrypted program produced by inserting two sets of protection bit codes in a source program for encryption and having a plurality of instructions, wherein one word contains two encrypted instructions and the protection bit codes are parity bits, the device comprising:

a first protection-bit-code location generator, which generates first insertion positions for the protection bit codes in accordance with a processor status when executing the encrypted program;

a second protection-bit-code location generator, which generates second insertion positions for the protection bit codes in accordance with the processor status when executing the encrypted program;

a first protection-bit-code removal unit, which inputs a low half word of the encrypted program and removes N1)th bit from 0th-(K−1)th bits of a respective instructions of the encrypted program input in accordance with each first insertion position N1 generated by the first protection-bit-code location generator, wherein N1 and K are integers respectively; and a second protection-bit-code removal unit, which inputs a high half word of the encrypted program and removes (N2)th bit from Kth-(2K−1)th bits of a respective instruction of the encrypted program input in accordance with each second insertion position N2 generated by the second protection-bit-code location generator.

23. The device as claimed in claim 22, wherein K=16.

24. A method of applying protection bit codes to encrypt a program for protection, the program having a plurality of instructions, each instruction having I (positive integer) bits and the protection bit codes are parity bits, the method comprising the steps:

a protection-bit-code generating step, which generates a corresponding plurality of protection bit codes in accordance with the instructions of the program, wherein each protection bit code has P (positive integer) bits;

a first protection-bit-code location generating step, which generates an insertion position N (positive integer) for each protection bit code in accordance with processor status when executing the program; and a protection-bit-code inserting step, which generates an encrypted program by inserting each protection bit code in a position between (N−1)th and Nth of a respective instruction of the program in accordance with each insertion position N generated in the first protection-bit-code location generating step;

a second protection-bit-code location generating step, which generates an insertion position N (positive integer) for each protection bit code in accordance with a processor status when executing the program; and a protection-bit-code removing step, which inputs the encrypted data and removes Nth bit of a respective instruction of the program in accordance with the insertion position N generated in the second protection-bit-code location generating step;

wherein the first protection-bit-code location generating step and the second protection-bit-code location generating step generate their insertion positions in accordance with the processor status when executing the program, where a position status flag is used to indicate that the processor is accessing data or program block and a program status flag is used to indicate current processor status, and each protection-bit-code location generating step further comprises the steps:

a plurality of insertion-position generating steps, which generates a plurality of insertion positions in accordance with predetermined functions respectively; and a multiplexing step, which selects one insertion position from outputs generated in the insertion-position generating steps as an output in accordance with the position status flag and the program status flag.

25. The method as claimed in claim 24, wherein the insertion-position generating steps are null steps respectively for representation of no insertion position.

26. The method as claimed in claim 24, wherein the insertion-position generating steps generate the plurality of insertion positions respectively by applying a given value to a function operation.

27. The method as claimed in claim 24, wherein the insertion-position generating steps generate the plurality of insertion positions respectively by subtracting a result of function operation of a second given value from a first given value.

28. The method as claimed in claim 24, wherein the insertion-position generating steps generate the plurality of insertion positions respectively by applying a union of a first given value and a partial address value to a function operation.

29. The method as claimed in claim 24, wherein the insertion-position generating steps generate the plurality of insertion positions respectively by combining contents of the position status flag and the program status flag.

30. The method as claimed in claim 24, wherein the insertion-position generating steps generate the plurality of insertion positions respectively by firstly combining contents of the position status flag and the program status flag and then performing a function operation on the combined.

31. The method as claimed in claim 24, wherein the protection-bit-code removing step further moves the Nth bit of the respective instruction of the program to the most significant bit (MSB) of the respective instruction in accordance with the insertion position N generated in the second protection-bit-code location generating step.

32. The method as claimed in claim 24, wherein the protection-bit-code removing step further moves the Nth bit of the respective instruction of the program to the least significant bit (LSB) of the respective instruction in accordance with the insertion position N generated in the second protection-bit-code location generating step.

33. The method as claimed in claim 24, wherein the protection-bit-code removing step further outputs the respective instruction of the program directly in accordance with the insertion position N generated in the second protection-bit-code location generating step.

34. The method as claimed in claim 24, wherein I+P=32.

35. The method as claimed in claim 24, wherein I=32, I is the number of bits in the instruction.

36. A method of decrypting an encrypted program produced by inserting protection bit codes in a source program for encryption and having a plurality of instructions in which the protection bit codes are parity bits, the method comprising the steps:

a protection-bit-code location generating step, which generates insertion positions respectively for the protection bit codes in accordance with processor status when executing the encrypted program; and a protection-bit-code removing step, which inputs the encrypted program in order to remove Nth bit of a respective instruction of the encrypted program in accordance with each insertion position N (positive integer) generated in the protection-bit-code location generating step;

wherein the protection-bit-code location generating step generates the insertion positions in accordance with a processor status when executing the encrypted program, where a position status flag is used to indicate that a processor is accessing data or program block and a program status flag is used to indicate current processor status, and the protection-bit-code location generating step further comprises:

a plurality of insertion-position generating steps, which generate insertion positions in accordance with predetermined functions respectively; and a multiplexing step, which, selects one insertion position from outputs generated in the insertion-position generating steps as an output in accordance with the position status flag and the program status flag.

37. The method as claimed in claim 36, wherein the insertion-position generating steps are null steps respectively for representation of no insertion position.

38. The method as claimed in claim 36, wherein the insertion-position generating steps generate the plurality of insertion positions respectively by applying a given value to a function operation.

39. The method as claimed in claim 36, wherein the insertion-position generating steps generate the plurality of insertion positions respectively by subtracting a result of function operation of a second given value from a first given value.

40. The method as claimed in claim 36, wherein the insertion-position generating steps generate the plurality of insertion positions respectively by applying a union of a first given value and a partial address value to a function operation.

41. The method as claimed in claim 36, wherein the insertion-position generating steps generate the plurality of insertion positions respectively by combining contents of the position status flag and the program status flag.

42. The method as claimed in claim 36, wherein the insertion-position generating steps generate the plurality of insertion positions respectively by firstly combining contents of the position status flag and the program status flag and then performing a function operation on the combined.

43. The method as claimed in claim 36, wherein I+P=32.

44. The method as claimed in claim 36, wherein I=32, I is the number of bits in the instruction.

45. A method of decrypting an encrypted program produced by inserting two sets of protection bit codes in a source program for encryption and having a plurality of instructions, wherein one word contains two instructions and the protection bit codes are parity bits, the method comprising:

a first protection-bit-code location generating step, which generates first insertion positions for the protection bit codes in accordance with processor status when executing the encrypted program;

a second protection-bit-code location generating step, which generates second insertion positions for the protection bit codes in accordance with processor status when executing the encrypted program;

a first protection-bit-code removing step, which inputs a low half word of the encrypted program and removes (N1)th bit from 0th-(K−1)th bits of a respective instruction of the encrypted program input in accordance with each first insertion position N1 (positive integer) generated in the first protection-bit-code location generating step; and a second protection-bit-code removing step, which inputs a high half word of the encrypted program and removes (N2)th bit from Kth-(2K−1)th bits of a respective instruction of the encrypted program input in accordance with each second insertion position N2 (positive integer) generated in the second protection-bit-code location generating step.

46. The method as claimed in claim 45, wherein K=16.

* * * * *